United States Patent [19]
Gondusky et al.

[11] Patent Number: 5,209,399
[45] Date of Patent: May 11, 1993

[54] AUTOMOTIVE OIL LEVEL CONTROL VALVE APPARATUS

[75] Inventors: Joseph M. Gondusky, Warwick, R.I.; Eric J. Giasson, Somerset, Mass.; Alfred J. White, North Providence, R.I.

[73] Assignee: Texas Instruments Incorporated, Dallas, Tex.

[21] Appl. No.: 897,185

[22] Filed: Jun. 11, 1992

[51] Int. Cl.$^5$ .......................................... G05D 23/08
[52] U.S. Cl. ................... 236/93 R; 236/101 C; 236/101 E
[58] Field of Search ............ 236/93 R, 101 C, 101 E, 236/101 R

[56] References Cited

U.S. PATENT DOCUMENTS

| | | | |
|---|---|---|---|
| 2,421,713 | 6/1947 | Porter | 236/93 R X |
| 4,412,650 | 11/1983 | Young et al. | 236/101 E X |
| 4,502,627 | 3/1985 | Ty | 236/93 R |
| 4,781,575 | 11/1988 | Ferri et al. | 431/90 |
| 4,865,250 | 9/1989 | Zaveri | 236/93 R |
| 4,921,165 | 5/1990 | Ty et al. | 236/93 R |
| 5,110,045 | 5/1992 | Glasson et al. | 236/93 R |

*Primary Examiner*—William E. Tapolcai
*Attorney, Agent, or Firm*—Russell E. Baumann; Richard L. Donaldson; Rene' E. Grossman

[57] ABSTRACT

A fluid level control valve has a base with a precisely controlled aperture formed therein which mounts on a transmission oil reservoir. A cover is pivotably disposed over the aperture and is biased by a thermostatic element in a direction tending to close the aperture. The thermostatic element is an elongated flat strip having each end captured by a bracket formed in each end of the base. A calibration post is precisely positioned on the cover to work with the brackets to place the thermostatic element in the desired position to provide a preselected force on the cover. The base has legs extending from the periphery of the controlled aperture for precisely attaching the valve to the housing of the transmission oil reservoir.

12 Claims, 3 Drawing Sheets

AUTOMOTIVE OIL LEVEL CONTROL VALVE APPARATUS

BACKGROUND OF THE INVENTION

This application relates generally to a fluid control valve and more particularly to a temperature responsive valve for use with a transmission oil reservoir.

Hydraulic pressure systems as used in motor vehicles require a supply of transmission fluid and the maintaining of a constant oil level in the transmission oil pan at all operating temperatures for trouble free transmission performance. Conventionally the oil pan serves as a sump to provide the necessary supply, however, in front wheel drive vehicles the transmission oil pan is too shallow to hold a suitable quantity. The problem is exacerbated by the fact that the volume of the oil used expands in the order of thirty eight percent at elevated temperatures. The problem has been dealt with by employing an auxiliary reservoir, for example, in the side of the transmission case cover. The fluid level in the auxiliary reservoir is controlled by a thermostatic element which controls the opening and closing of a cover plate in the transmission housing in response to the temperature of the oil in the auxiliary reservoir. As the temperature of the oil in the reservoir decreases the cover plate opens allowing the oil to drain into the lower sump or oil pan to maintain the desired oil level.

Examples of such valves are as set forth in U.S. Pat. Nos. 4,865,250 and 4,921,165 issued on Sep. 12, 1989 and May 1, 1990 respectively assigned to the assignor of the instant application.

Although these valves have proven to generally provide the desired function there still has been inconsistent operation flow control from one transmission to another which it is desirable to correct. Such inconsistency can lead to faulty operation of a certain number of the transmissions in which the valves are incorporated.

SUMMARY OF THE INVENTION

Accordingly, it is an object of the present invention to provide a thermostatically controlled valve which will consistently provide desired oil level control in an automotive transmission oil pan. Another object is the provision of such a control which is inexpensive and is more easily installed than conventional devices. Yet another object is the provision of a control valve which is simple yet one which is reliable and consistent as used from one transmission to another.

Other objects and features of the invention will become more readily understood from the detailed description and drawings in which like reference numerals designate like parts throughout the figures thereof.

Briefly, in accordance with this invention, a valve assembly adapted for mounting to an oil reservoir comprises an elongated base member having a precisely sized aperture formed therein and having upstand bracket means at each end. A cover having a size greater than that of the precisely sized aperture is mounted on the base member so as to generally cover the aperture and is adapted to move from a position closing the aperture to a position in which the aperture is open. The cover further has a post portion of preselected height extending away from the cover. A thermostatic element in the form of a generally flat elongated strip is mounted on the base in the bracket means positioned so as to have an intermediate portion in direct contact and resting upon the post member portion of the cover for imparting a closure force on the cover which varies with temperature. Resilient leg members positioned along the aperture in the base are provided to allow easy, reliable, and precise attachment of the valve to the oil reservoir.

Accordingly, the present invention also provides for the use of components that can be consistently and uniformly produced and a design with a high level of control of fluid flow area in the device.

DETAILED DESCRIPTION OF THE PREFERRED EMBODIMENTS

Figure 1:
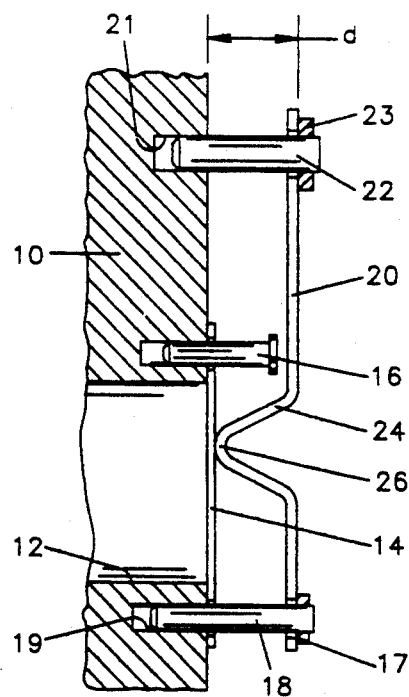
FIGS. 1 and 2 show a prior art device comprising a cover plate movably mounted over a drain aperture on the side of a transmission case cover under the control of a thermostatic element and being movable between a closed position (FIG. 1) and an opened position (FIG. 2)
Figure 2:
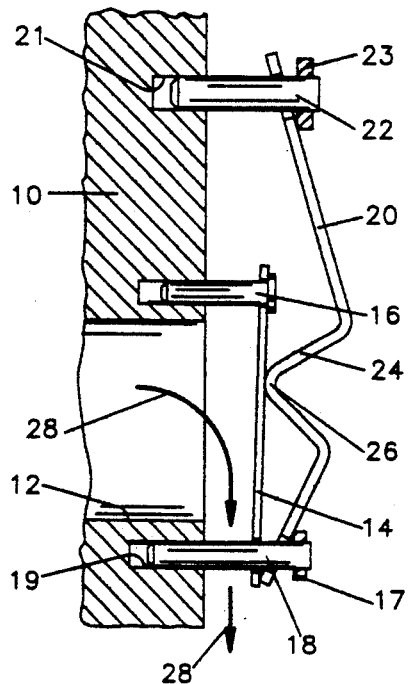
Figure 3:
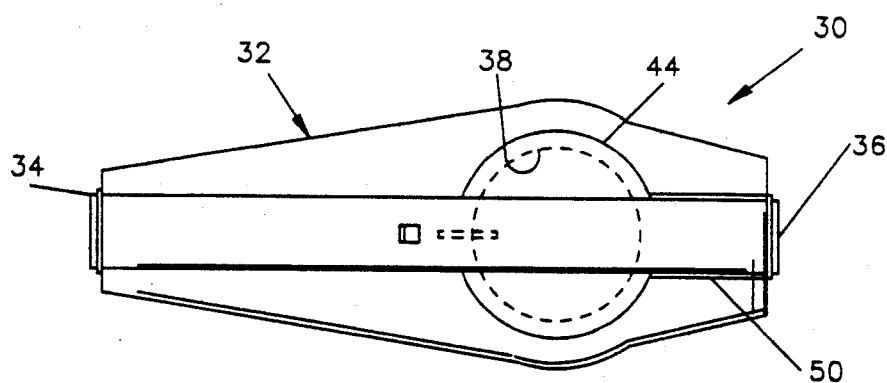
FIG. 3 shows a top plan view of an oil level control valve made in accordance with the present invention.

With reference to FIGS. 1 and 2, a broken cut away portion of a transmission case cover 10 is shown having a drain passage 12 leading to an auxiliary reservoir. A conventional control for providing an adequate supply of oil in the sump positioned below the drain passage comprises a cover plate 14 disposed over the passage 12 slidably mounted on pins 16, 18 so that the cover can move between a closed position as shown in FIG. 1 (when the vehicle is not in operation) and an opened position shown in FIG. 2. A thermostatic element 20 in the form of an elongated strip having pin receiving slots at its opposite ends is mounted on pins 18 and 22 and captured there by the bushings 17 and 23. Element 20 is formed intermediate its ends with a generally V-shaped force imparting portion 24 having apex 26 in engagement with cover plate 14. Element 20 is mounted on case cover 10 by inserting pins 18 and 22 through respective slots in element 20 with pin 18 also inserted through a slot in cover plate 14 and then driving the pins into respective bores 19, 21 in the transmission case cover in an interference fit to a selected dimension "d" as shown in FIG. 1 at a selected temperature, e.g., normal room temperature. During operation oil circulates through the transmission system with the oil pushing the cover plate toward the open position against the bias of the thermostatic element. As the temperature of the oil in the auxiliary reservoir increases, its temperature is transferred to thermostatic element 20 and the force exerted by element 20 through apex 26 on cover plate 14 increases until at some elevated temperature the cover plate is nearly in a closed position as indicated by the dashed lines of cover 14 in FIG. 1. When the oil is cold, however, less force is exerted by element 20 so that the pressure exerted by the oil in passage 12 pushes cover 14 toward a regulated opened position shown in FIG. 2 allowing the oil in the auxiliary reservoir to flow into sump (see arrows 28) to maintain the desired level in the sump.

Although this control works well in some installations there has been a vexing problem of inconsistency from one transmission to another affecting the performance of the control. Element 20 is a stamped part of a bent configuration and its precise configuration tends to vary slightly from one part to another, similarly, the dimension "d" is not actually the same for all the controls. This has resulted in a variance of up to 30% from the designed force level at a given temperature. In order to avoid the possibility of having inadequate lubrication which would result when there is insufficient oil in the sump there has been a tendency to increase the amount of oil so that in the worst case of a variance from the designed force level there is an adequate supply. However, this causes problems in units in which the control does not vary significantly from the designed level resulting in too much oil in the sump causing frothing with concomitant deleterious effects on the performance of the transmission due to the presence of air in the hydraulic system.

This prior art design described above and to some extent those referenced in the discussion of the prior art have the same potential design problems in which standard tolerance variations can lead to the consistency problems from transmission to transmission.

The control valve in accordance with this invention minimizes these standard tolerance variations with a simple, economical valve which is easy to produce. This valve design overcomes the problem of the prior devices and provides a valve in which the performance of the control is consistent from one transmission to another.

Figure 4:
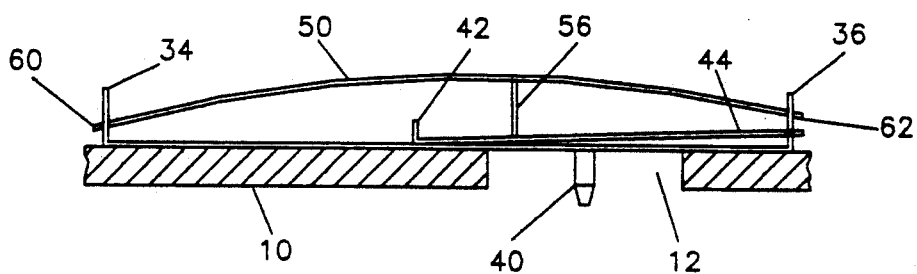
FIG. 4 shows a front elevational view of the FIG. 3 valve mounted on a transmission case cover.
Figure 5:
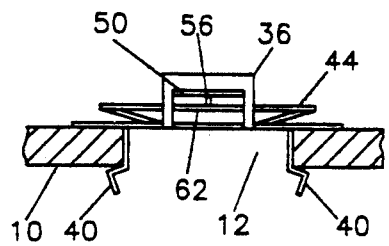
FIG. 5 shows an end elevational view of the FIG. 3 valve mounted on a transmission case cover.

With reference to FIGS. 3-7 numeral 30 designates a control valve made in accordance with the invention. A flat base plate 32 formed of suitable material such as a 400 series stainless steel is generally in the form of an elongated shape having upwardly extending brackets 34, 36 at respective opposite ends thereof. Brackets 34, 36 are typically formed as an integral part of plate 32 with an inverted U-shape for receipt of the thermostatic element 50 to be discussed below. Base 32 is formed with a precisely dimensioned aperture 38 therethrough of a dimension slightly less than that of passage 12 of the transmission case cover 10. Aperture 38 is preferably of circular shape. A plurality of resilient leg members 40 are provided around the periphery of aperture 38 preferably formed as an integral part of base plate 32 for securing the base plate to transmission case cover 10. As shown in FIG. 4 formed leg members 40 have a spider like zig-zag shape for securely holding the plate flat against the cover by a generally snap action. Intermediate and in axial alignment with the center of brackets 34, 36 is a cover retainer member 42 which precisely establishes the point of rotation or hinge point for a cover plate 44 discussed below. Typically, the retainer member 42 is made by piercing the base on three sides and then bending the pierced portion upward at a right angle to the base forming the generally square member. The positioning of this retainer member on base 32 is important in controlling operation of the valve and such a member can be held to close tolerance as it is readily formed as a single stamped portion of base 32.

Figure 6:
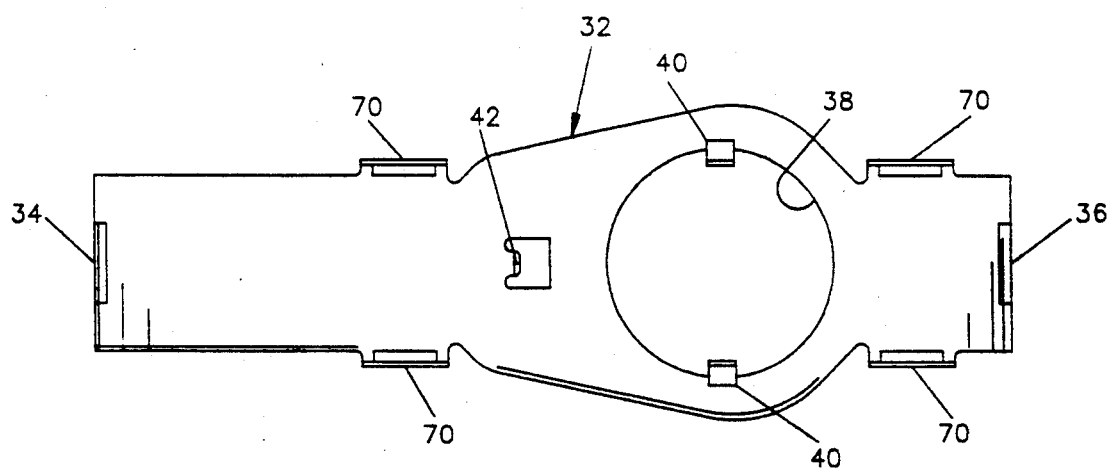
FIG. 6 shows a top plan view of the base member of FIG. 3 with attachment brackets for a protective cover.
Figure 7:
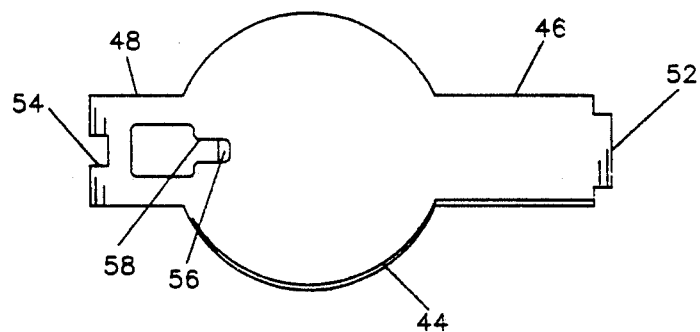
FIG. 7 shows a top plan view of the cover member of FIG. 3.
Figure 8:
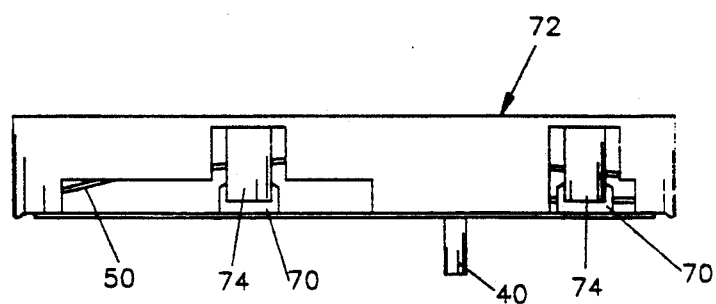
FIG. 8 shows a front elevational view of the present invention with a protective cover attached.

A flat cover plate member 44 typically of metal preferably of a general shape similar and larger than that of aperture 38 is positioned on base 32 so that its periphery totally covers aperture 38. As shown in FIG. 6 cover plate 44 has two extending leg portions 46 and 48. Leg portion 46 has a tab portion 52 at its distal end which is received in U-shaped bracket 36. Leg 48 has notched portion 54 in which retainer member 42 is received. Cover member is slidingly movable within bracket 36 and generally pivoting against retainer member 42. Although in extreme conditions the cover can move up retainer member 42.

Intermediate and preferably axially aligned with bracket 36 and retainer member 42 but nearer retainer member 42 is a post member 56 extending upwardly from cover 44. Preferably post 56 is formed from a punched out portion of cover 44 and thus is an integral part of cover 44. This design also leaves a small aperture 58 in the cover which is in fluid communication with aperature 38 in the base so as to allow a controlled and limited amount of oil to pass through from the auxiliary reservoir at all times to improve heat coupling of element 50 with the oil in the auxiliary reservoir.

Thermostatic element 50, generally co-extensive with base 32, is a flat strip of specifically controlled length thickness and width with tab portions 60 and 62 of reduced width for insertion in brackets 34 and 36 of base member 32.

This element is designed to be flat and thus easy to manufacture without potential tolerance variations of V-shaped, U-shaped, etc., thermostatic elements in the prior art. The element with selected temper and dimensions extends from base brackets 34 and 36 resting on post 56 for imparting a force on cover plate 44 which varies with temperature.

In assembly, valve 30 is mounted on cover 10 with the plurality of resilient legs 40 snapping the valve in place securely holding it at the desired position. There is no need for special tool for installation and/or the making of special holes in the transmission case cover. The aperture in the base precisely controls flow area and the center point of the aperture in the base controls the other important dimensions in the valve to minimize tolerance variations. The base member, cover member, and thermostatic element are made by precision stamping process as is known in the art and are assembled with reference in particular to the base member. There is only one mounting means to the cover with the legs acting to self-center the valve on the cover and precision dimensioned aperture to set flow area. The thermostatic element is of a simple, flat, easily reproducible configuration with uniform width and length and no special forming. Additionally, the use of the flat thermostatic element with the stamped tab portions precisely contained in the base brackets 34 and 36 along with the accurate positioning and length control of post 56 does away with the need of any calibration following assembly. The use of this design has greatly reduced the inconsistencies in the valves from transmission to transmission.

In accordance with this invention one variation of the device would include tab members 70 on the two sides of the base member extending upward generally perpendicular to the base and preferably made integral with the base for receiving a top valve housing 72 of plastic or the like for protection of the valve and to minimize contamination. The protection cover means 72 typically would have extending leg portions 74 which would latch with the tab members 70.

Although the invention has been described with respect to a specific preferred embodiment thereof, many variations and modifications will become apparent to those skilled in the art. It is the intent that the appended claims be interpreted as broadly as possible in view of the prior art to include all such variations and modifications.

We claim:

1. An oil level control valve for controlling oil flow in a transmission housing having a drain passage aperture comprising a generally elongated base member, an aperture in said base member in alignment with the drain passage aperture, attachment means associated with said base member for attachment of said control valve to said transmission housing by engagement with said drain passage aperture, bracket means extending from each of the two ends of the base member away from said transmission housing, a cover member received over the aperture in the base member and being adapted to move toward and away from said base member aperture, a post member extending from said cover member away from said transmission housing positioned between said bracket members, and a generally flat thermostatic strip in the unassembled state having precisely controlled preselected dimensions in which each end of said strip is received in said bracket means with a portion of said strip intermediate both ends in contact with said post member thereby providing a preselected biasing force on the cover member which varies with the temperature of the thermostatic strip.

2. The oil level control valve of claim 1 wherein said attachment means associated with said base member is of plurality of resilient leg member positioned around the periphery of the aperture in said base member for snapping said control valve in the drain passage aperture of the transmission housing for accurate positioning of the valve.

3. The oil level control valve of claim 1 wherein said aperture in said base member has the same general center point as the drain passage aperture and has a diameter which is slightly smaller.

4. The oil level control valve of claim 3 wherein said aperture in said base member is circular and has a precisely controlled diameter.

5. The oil level control valve of claim 1 wherein said bracket means is an integral part of elongated base member with two generally inverted hollow U-shape members for receipt of the ends of the thermostatic strip.

6. The oil level control valve of claim 5 wherein said bracket means are two brackets having the same center axis as that of the aperture in said base member.

7. The oil level control valve of claim 1 wherein said post member is an integral part of said cover member and is precisely positioned along the same axis as that of said bracket means.

8. The oil level control valve of claim 7 wherein said post member is formed from a punched out portion of cover 44 thereby leaving a cut out portion in the cover which is in fluid communication with said aperture in said base member to provide a controlled and limited oil bleed path from said drain passage aperture of said transmission housing to said thermostatic member.

9. The oil level control valve of claim 1 further including a retainer means extending from the base member for receiving one end of said cover member with other end being received in said bracket means.

10. The oil level control valve of claim 9 wherein said retainer mean is integral with said base member and formed from a punched out portion of the base member.

11. The oil level control valve of claim 9 wherein said bracket means, said retainer means, said post member and said center line of the aperture in the base member all lie along the same axis.

12. An oil level control valve for controlling oil flow in a transmission housing having a drain passage aperture for carrying oil comprising a generally elongated base member, an aperture in said base member in alignment with said drain passage aperture, a plurality of resilient leg members positioned around the periphery of the aperture in said base member for easily snapping said control valve in the drain passage aperture of the transmission housing for accurate positioning of the valve, a bracket member extending from each of the two ends of the base member in a direction away from said transmission housing, a cover member received over the aperture in the base member and being adapted to move toward and away from said base member aperture, a post member of preselected length extending from said cover member away from said transmission housing positioned between said bracket members and a flat thermostatic strip member in the unassembled state having precisely controlled preselected dimensions in which each end of said strip is received in one of the bracket members with a portion of said strip intermediate both ends in contact with the distal end of said post member thereby providing a preselected biasing force on the cover member which varies with the temperature of the thermostatic strip for controlling flow of oil through the valve.

* * * * *